(12) United States Patent
Lee (10) Patent No.: US 9,969,423 B2
(45) Date of Patent: May 15, 2018

(54) MOTOR DRIVEN POWER STEERING SYSTEM

(71) Applicant: HYUNDAI MOBIS CO., LTD., Seoul (KR)

(72) Inventor: Kyung Min Lee, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 338 days.

(21) Appl. No.: 15/004,684

(22) Filed: Jan. 22, 2016

(65) Prior Publication Data

US 2016/0221600 A1  Aug. 4, 2016

(30) Foreign Application Priority Data

Feb. 3, 2015 (KR) .................. 10-2015-0016805

(51) Int. Cl.
| | |
|---|---|
| *B62D 5/04* | (2006.01) |
| *B62D 3/04* | (2006.01) |
| *F16D 3/02* | (2006.01) |
| *F16D 3/72* | (2006.01) |

(52) U.S. Cl.
CPC ............. *B62D 5/0421* (2013.01); *B62D 3/04* (2013.01); *F16D 3/02* (2013.01); *F16D 3/72* (2013.01)

(58) Field of Classification Search
CPC ...... F16C 3/72; F16C 3/58; F16C 3/04; F16C 3/52; F16C 3/12; F16C 3/02
USPC ..... 403/204, 286, 292, 309, 310, 359.6, 383
See application file for complete search history.

(56) References Cited

U.S. PATENT DOCUMENTS

| | | | | | |
|---|---|---|---|---|---|
| 2,634,991 | A | * | 4/1953 | Stevens | F16D 1/08 403/383 |
| 5,564,308 | A | * | 10/1996 | Hoshikawa | E05B 81/25 292/201 |
| 6,223,615 | B1 | * | 5/2001 | Huck | B60R 16/037 403/359.6 |
| 6,533,235 | B1 | * | 3/2003 | Dymerski | B60N 2/0232 248/421 |
| 6,709,234 | B2 | * | 3/2004 | Gilbert | F04D 7/065 403/305 |
| 9,205,861 | B2 | * | 12/2015 | Kim | F16D 3/68 |
| 9,435,400 | B2 | * | 9/2016 | Cheung | F16H 57/0025 |
| 9,527,523 | B2 | * | 12/2016 | Chae | B62D 5/04 |

(Continued)

FOREIGN PATENT DOCUMENTS

KR   10-2010-0009380 A   1/2010

*Primary Examiner* — Terence Boes
(74) *Attorney, Agent, or Firm* — Knobbe Martens Olson & Bear LLP (57) ABSTRACT

A motor driven power steering (MDPS) system is disclosed. The MDPS system includes a driving member configured to rotate about an axis; a worm shaft member having a worm gear and configured to rotate while engaged with a worm wheel; and a coupler member interposed between the driving member and the worm shaft member and configured to couple the driving member and the worm shaft and transmit power from the driving member to the worm shaft member. The coupler member includes a couple sleeve portion configured to receive and hold the driving member and the worm shaft member and a sleeve pressurizing portion surrounding the couple sleeve portion and configured to pressurize the couple sleeve portion toward the driving member or the worm shaft member.

12 Claims, 9 Drawing Sheets

(56) References Cited

U.S. PATENT DOCUMENTS

| | | | |
|---|---|---|---|
| 2012/0322566 A1* | 12/2012 | Kim .................... | B62D 5/0409 |
| | | | 464/88 |
| 2013/0102396 A1* | 4/2013 | Zhou ........................ | F16D 3/68 |
| | | | 464/73 |
| 2016/0131199 A1* | 5/2016 | Yamashita ................ | F16D 3/00 |
| | | | 74/405 |

* cited by examiner

MOTOR DRIVEN POWER STEERING SYSTEM

CROSS-REFERENCES TO RELATED APPLICATIONS

The present application claims priority to Korean application number 10-2015-0016805, filed on Feb. 3, 2015, which is incorporated by reference in its entirety.

BACKGROUND

The present disclosure relates to a motor driven power steering (MDPS) system, and more particularly, to an MDPS system which transmits power generated from a driving member to a worm shaft member and enables tilting of the worm shaft member.

A related technology is disclosed in Korean Patent Laid-open Publication No. 2010-0009380 published on Jan. 27, 2010 and titled "Gear's teeth contact upkeep typed motor driven power steering system in vehicle".

SUMMARY

Embodiments of the present invention are directed to an MDPS system which can be easily manufactured through a simple structure, has satisfactory durability, can reduce the number of parts to reduce the manufacturing cost and weight, can provide an axial load to improve rattle performance, and has favorable assembling property.

In a MDPS system, an electronic control unit drives a driving member to assist a driver's steering force, according to an operation condition of a vehicle, sensed through a vehicle speed sensor, a steering torque sensor or the like. Thus, the MDPS system provides a light and comfortable steering state during low-speed operation, and provides a heavy and stable steering state during high-speed operation. Furthermore, the MDPS system enables the driver to rapidly steer the vehicle during an emergency.

A MDPS system includes a driving member, a worm shaft member rotated in connection with the driving member, and a worm wheel engaged with the worm shaft member. Thus, the rotational force of the worm shaft member by the operation of a motor is added to the rotational force of a steering wheel operated by the driver and then transmitted to a steering shaft, thereby improving a steering feel and enabling a stable steering operation.

In general, a coupler member for coupling the driving member and the worm shaft member includes a pair of dogs coupled to the driving member and the worm shaft member, respectively, and a coupler interposed between the respective dogs. As the coupler is repetitively exposed to a load, the coupler is permanently deformed, the durability of the coupler is reduced. Due to the change of the load in the axial direction, rattle noise occurs. Furthermore, since the plurality of dogs are applied, the coupler member has a complex structure, and the price and weight of the coupler member are inevitably increased. Thus, there is a demand for a structure capable of improving such problems.

In one embodiment, an MDPS system of a vehicle includes a driving member that is configured to receive rotational power from a motor in response to a driver's input for steering the vehicle; a worm shaft member having a worm gear and configured to rotate while engaged with a worm wheel of the vehicle; and a coupler member interposed between the driving member, configured to couple the driving member and the worm shaft member and transfer the rotational power from the driving member to the worm shaft member. The coupler member includes a couple sleeve part surrounding the driving member and the worm shaft member; and a sleeve pressurizing part surrounding the couple sleeve part and pressurizing the couple sleeve part toward the driving member or the worm shaft member.

The couple sleeve part may include: a driving member sleeve surrounding a rotating shaft of the driving member; a worm shaft sleeve surrounding the worm shaft member; and a sleeve connection part connecting the driving member sleeve and the worm shaft sleeve.

The sleeve connection part may have a transverse cross-sectional surface formed in a polygonal shape.

The driving member sleeve may be arranged along the circumference of the rotating shaft.

The worm shaft sleeve may be arranged along the circumference of the worm shaft member.

End parts of the rotating shaft and the worm shaft member, inserted into the sleeve connection part, may have a transverse cross-sectional surface formed in a polygonal shape.

End parts of the rotating shaft and the worm shaft member, coupled to the coupler member, may have a shape of which the transverse cross-sectional surface is narrowed along the direction in which the rotating shaft and the worm shaft member are inserted into the coupler member.

The rotating shaft and the worm shaft member may be inserted and coupled to the coupler member.

The sleeve pressurizing part may be formed in a ring shape including an elastic material, and seated on the outer circumferential surface of the couple sleeve part so as to pressurize the couple sleeve part toward the rotating shaft or the worm shaft member.

The sleeve pressurizing part may be seated in a pressurizing part seating groove formed in a concave shape on the outer circumferential surface of the couple sleeve part.

The driving member sleeve, the worm shaft sleeve, and the sleeve connection part may be formed of an elastic material.

The driving member sleeve, the worm shaft sleeve, and the sleeve connection part may be integrated with each other.

DESCRIPTION OF EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of embodiments the invention into account and can be changed according to the custom or intention of users or operators. Therefore, definition of the terms should be made according to the overall disclosures set forth herein.

Figure 1:
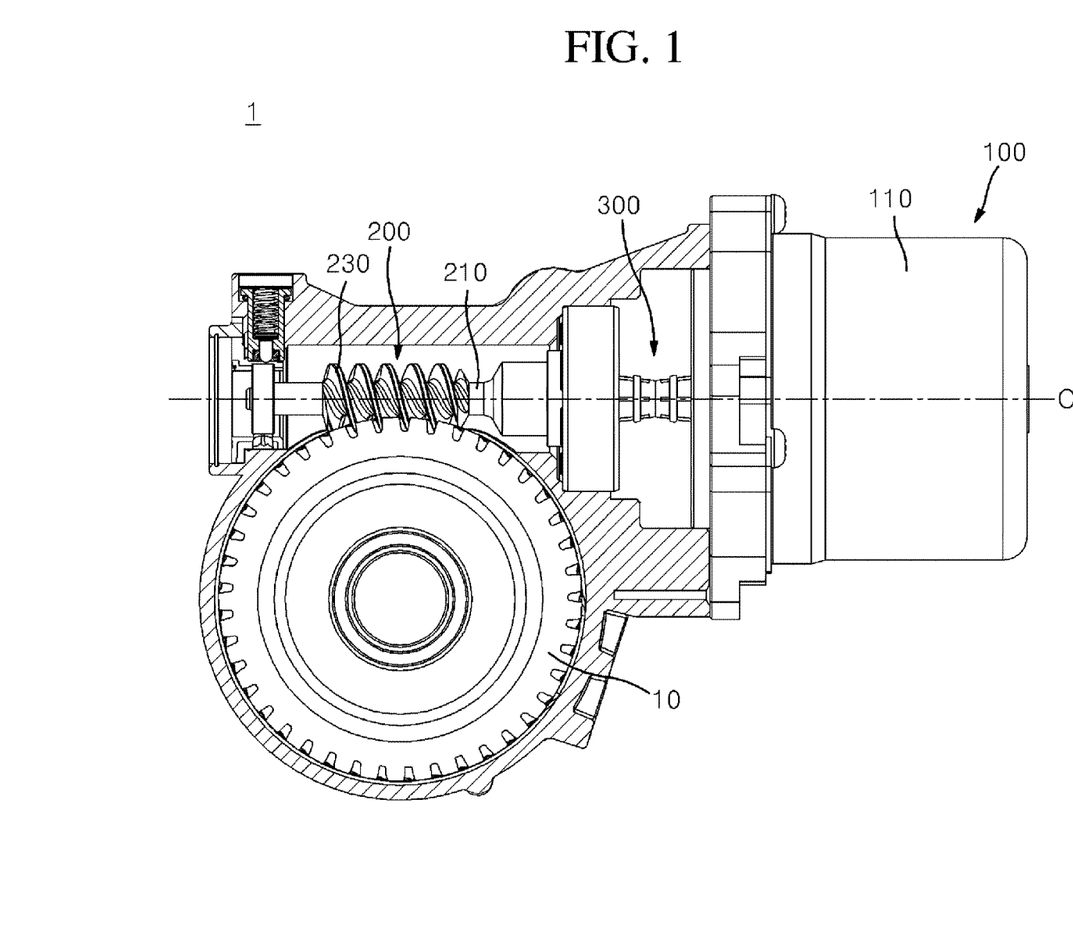
FIG. 1 is a cross-sectional view of a motor driven power steering (MDPS) system in accordance with an embodiment of the present invention.
Figure 2:
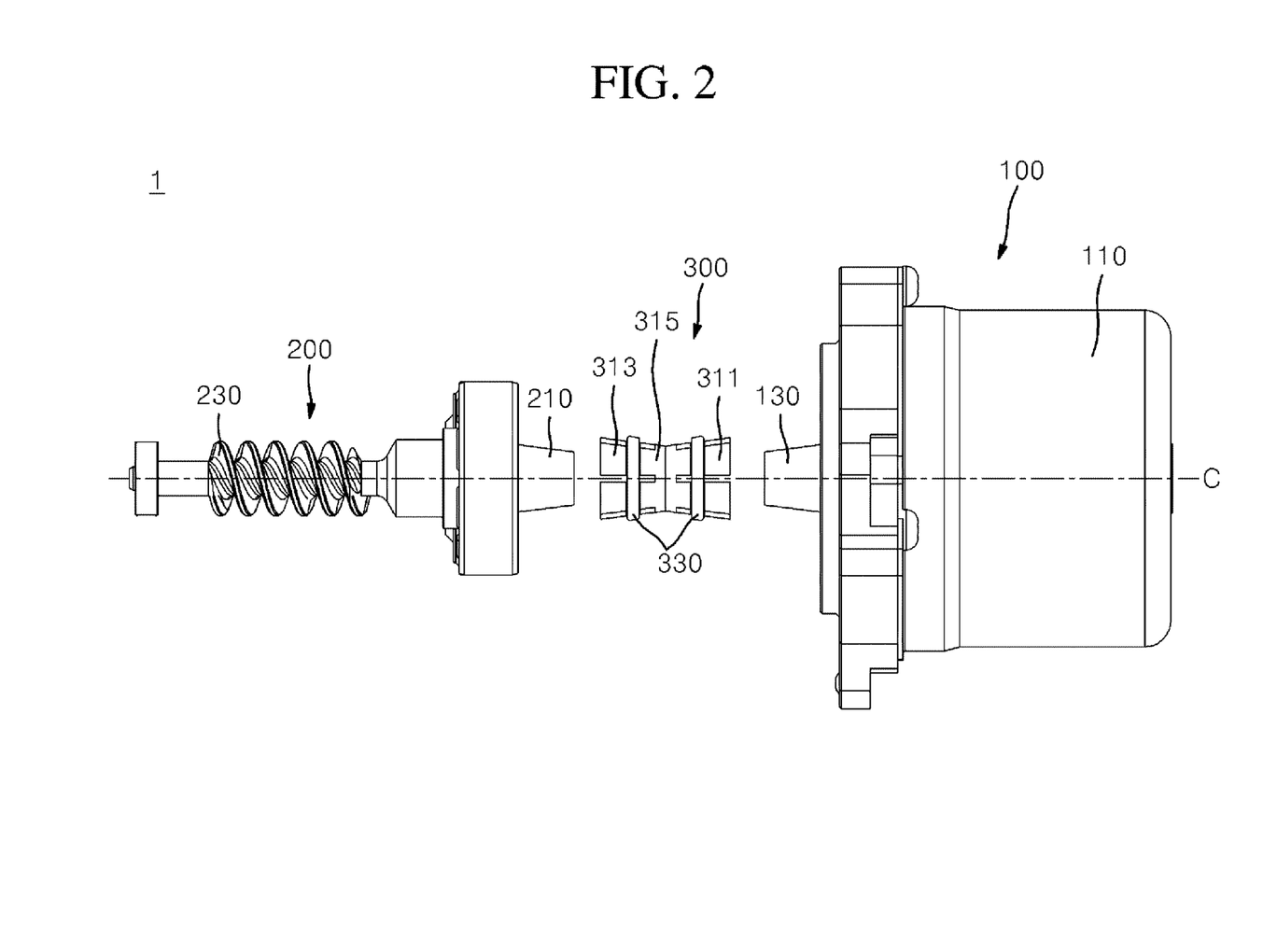
FIG. 2 is a side view of the MDPS system in accordance with an embodiment of the present invention.
Figure 3:
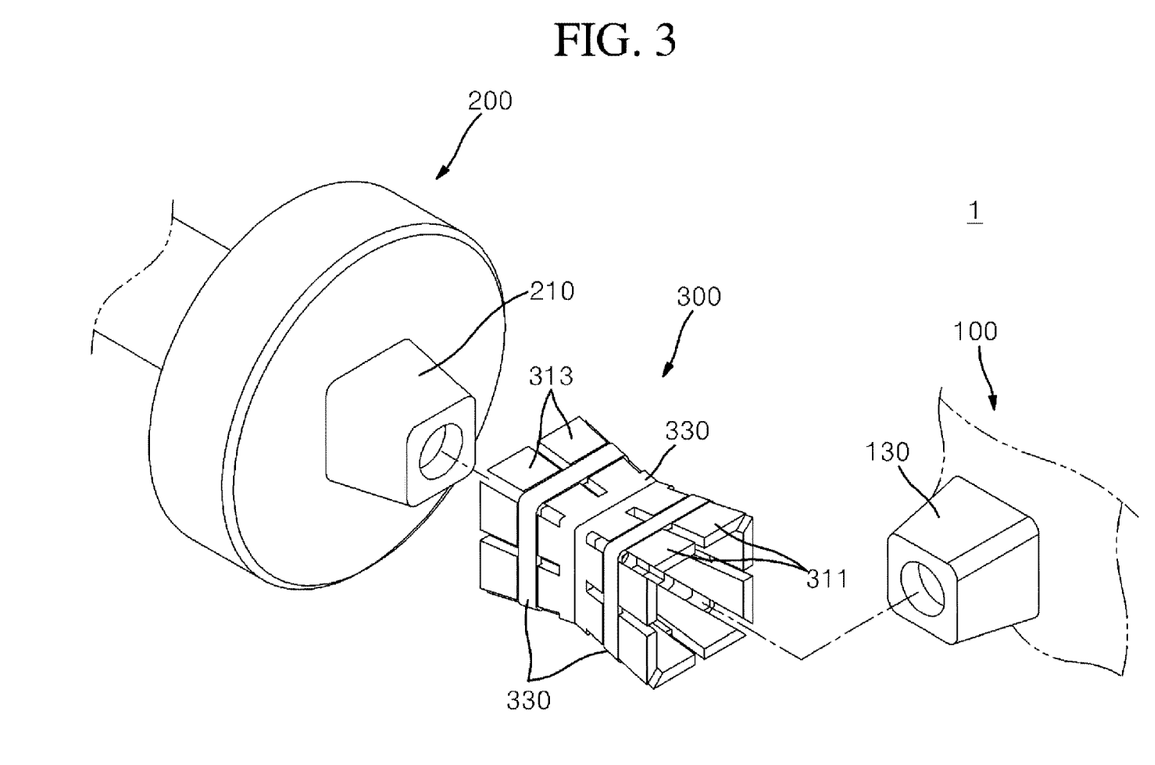
FIG. 3 is a perspective view of the MDPS system in accordance with an embodiment of the present invention.

FIG. 1 is a cross-sectional view of a motor driven power steering (MDPS) system in accordance with an embodiment of the present invention. FIG. 2 is a side view of the MDPS system in accordance with an embodiment of the present invention. FIG. 3 is a perspective view of the MDPS system in accordance with an embodiment of the present invention.

Referring to FIGS. 1 to 3, the MDPS system in accordance with an embodiment of the present invention may include a driving member 100, a worm shaft member 200, and a coupler member 300.

The driving member 100 may generate power. In an embodiment of the present invention, the driving member 100 may include an electric motor which converts electric power applied from outside into motive power. The driving member 100 may include a rotating shaft 130 exposed to one side (the left side of FIG. 1), and the rotational energy of the rotating shaft 130 may be transmitted to the worm shaft member 200 through the coupler member 300. The driving member 100 may include a driving unit 110 and the rotating shaft 130.

The driving unit 110 may include an electric motor, and convert electric power applied from outside into rotary power to rotate the rotating shaft 130.

The rotating shaft 130 may be coupled as a separate unit to the driving unit 110, or integrated with a rotor of the driving unit 110 and rotated according to the operation of the driving unit 110. In an embodiment of the present invention, the rotating shaft 130 may have an outer cross-sectional shape corresponding to the inner cross-sectional shape of the coupler member 300. Thus, the rotating shaft 130 can be inserted and coupled to the inside of the coupler member 300 and rotated with the coupler member 300.

The worm shaft member 200 may have a worm gear 230 engaged with a worm wheel 10. The worm shaft member 200 may be rotated in connection with the worm wheel 10. In an embodiment of the present invention, one end of the worm shaft member 200 may be coupled to the rotating shaft 130 through the coupler member 300, and transmit the rotational force of the rotating shaft 130 to the worm wheel 10. The worm shaft member 200 may include a worm shaft 210 and the worm gear 230.

The worm shaft 210 may be formed of a metallic material, and have a rod shape. The right end of the worm shaft 210 (based on FIG. 1) may be formed in a shape corresponding to the inner cross-sectional surface of the coupler member 300, and inserted and coupled to the inside of the coupler member 300. The worm shaft 210 may be rotated by the rotational force of the rotating shaft 130, which is received through the coupler member 300.

The worm gear 230 may be formed on the outer circumferential surface of the worm shaft 210, and engaged with a gear formed on the outer circumferential surface of the worm wheel 10. In an embodiment of the present invention, the worm gear 230 may be integrated with the worm shaft 210, and rotated according to the rotation of the worm shaft 210.

In an embodiment of the present invention, the rotating shaft 130 and the worm shaft 210 may have a transverse cross-sectional surface formed in a polygonal shape corresponding to the inner transverse cross-sectional shape of the coupler member 300, the transverse cross-sectional surface corresponding to a cross-sectional surface perpendicular to the central axis C of rotation at an end inserted into a sleeve connection part 315. Thus, the rotating shaft 130 and the worm shaft 210 can be inserted into the coupler member 300. In the drawings, a rectangular cross-section is taken as an example for description. However, a polygonal shape such as a triangular or pentagonal shape may be applied within a range that can smoothly transmit a rotational force.

Thus, the rotating shaft 130 and the worm shaft 210 may come in surface contact with the coupler member 300, and minimize a slip with the coupler member 300 during rotation, thereby reducing a loss of rotary power transmitted to the worm shaft member 200 from the driving member 100 and reducing the occurrence of noise.

In an embodiment of the present invention, the ends of the rotating shaft 130 and the worm shaft 210, coupled to the coupler member 300, may be formed in a taper shape of which the transverse cross-sectional surface is narrowed along the direction in which the ends are inserted into the coupler member 300, and inserted and coupled to the coupler member 300.

Thus, in the MDPS system in accordance with an embodiment of the present invention, the rotating shaft 130 and the worm shaft 210 may be easily coupled to the coupler member 300. Furthermore, according to the extent that the rotating shaft 130 and the worm shaft 210 are inserted into the coupler member 300, the coupler member 300 may be deformed to elastically support the rotating shaft 130 and the worm shaft 210.

Thus, while the rotating shaft 130 and the worm shaft 210 can be tilted, the rotating shaft 130 and the worm shaft 210 can be pressurized in the direction where the rotating shaft 130 and the worm shaft 210 are separated from each other, which makes it possible to prevent the occurrence of rattle noise between the worm gear 230 and the worm wheel 10.

Figure 4:
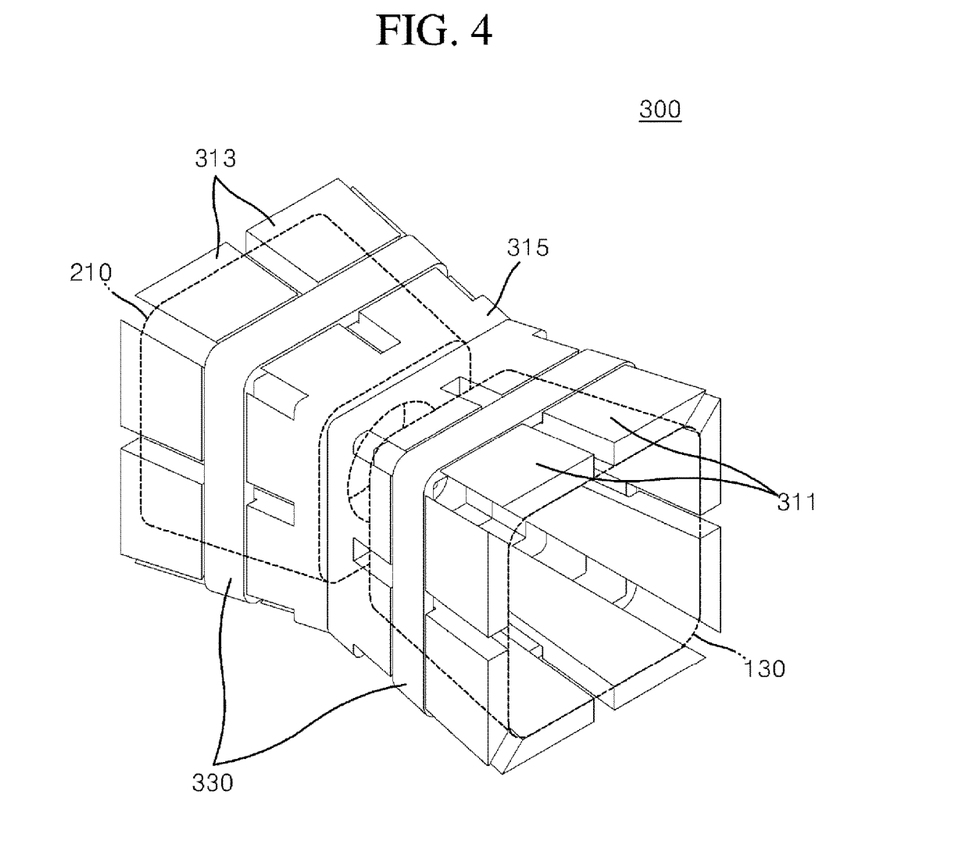
FIG. 4 is a perspective view illustrating a state in which the rotating shaft and the worm shaft are coupled to the coupler member in the MDPS system in accordance with an embodiment of the present invention.
Figure 5:
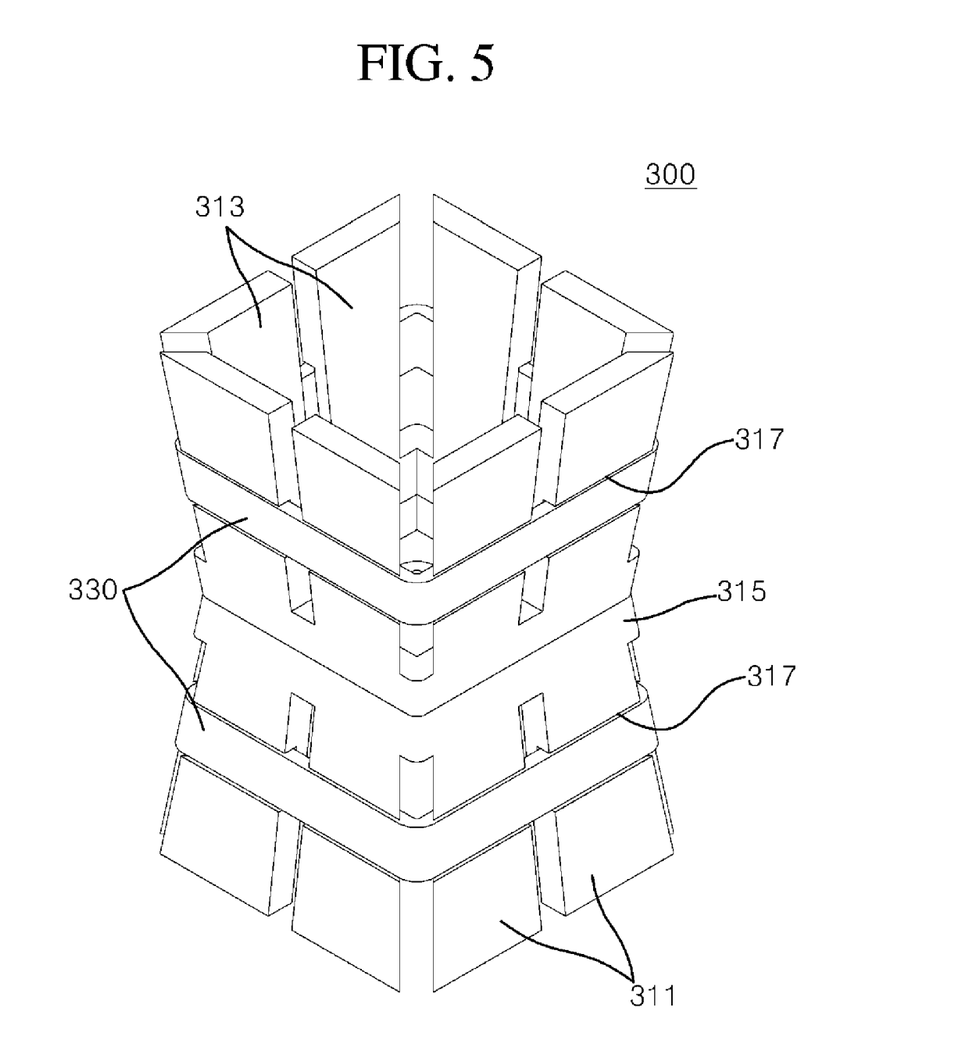
FIG. 5 is a schematic perspective view of the coupler member in the MDPS system in accordance with an embodiment of the present invention.
Figure 6:
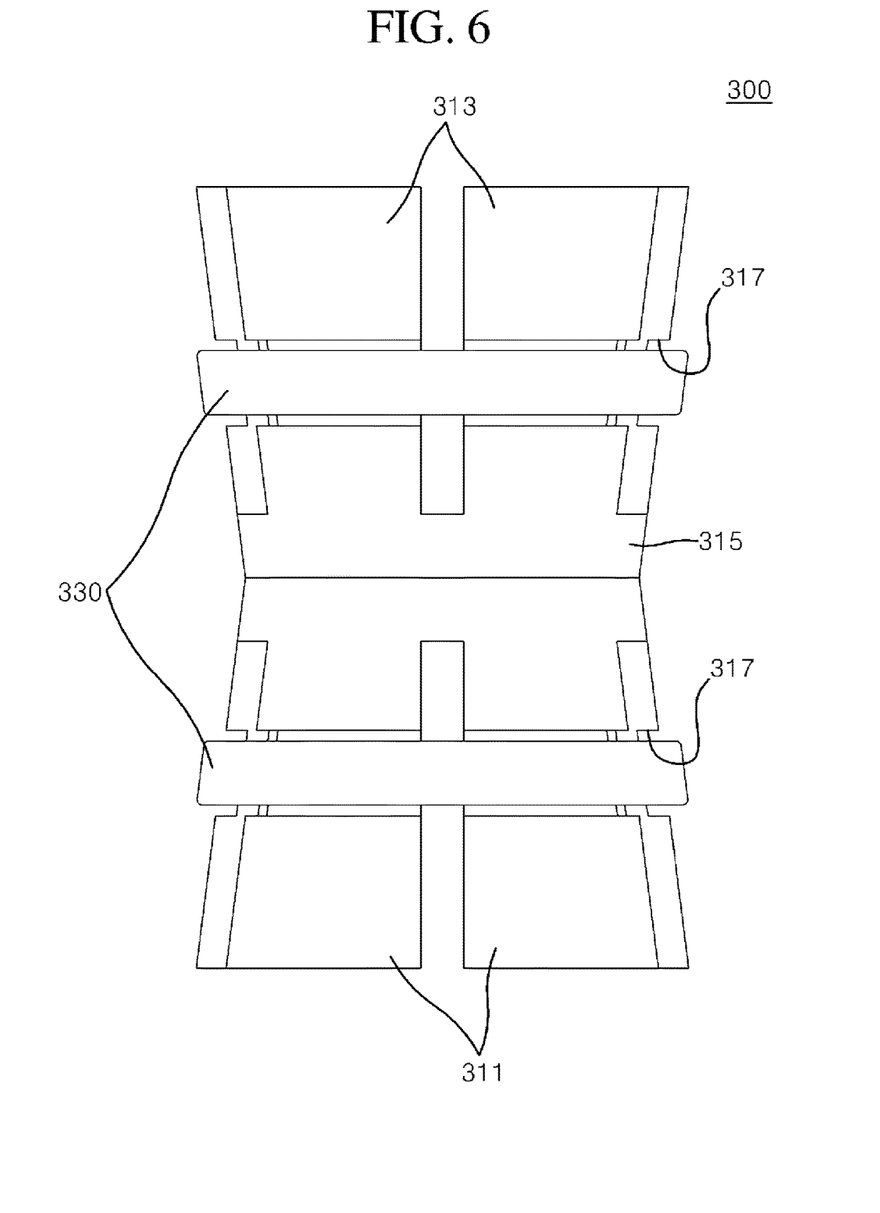
FIG. 6 is a schematic front view of the coupler member in the MDPS system in accordance with an embodiment of the present invention.
Figure 7:
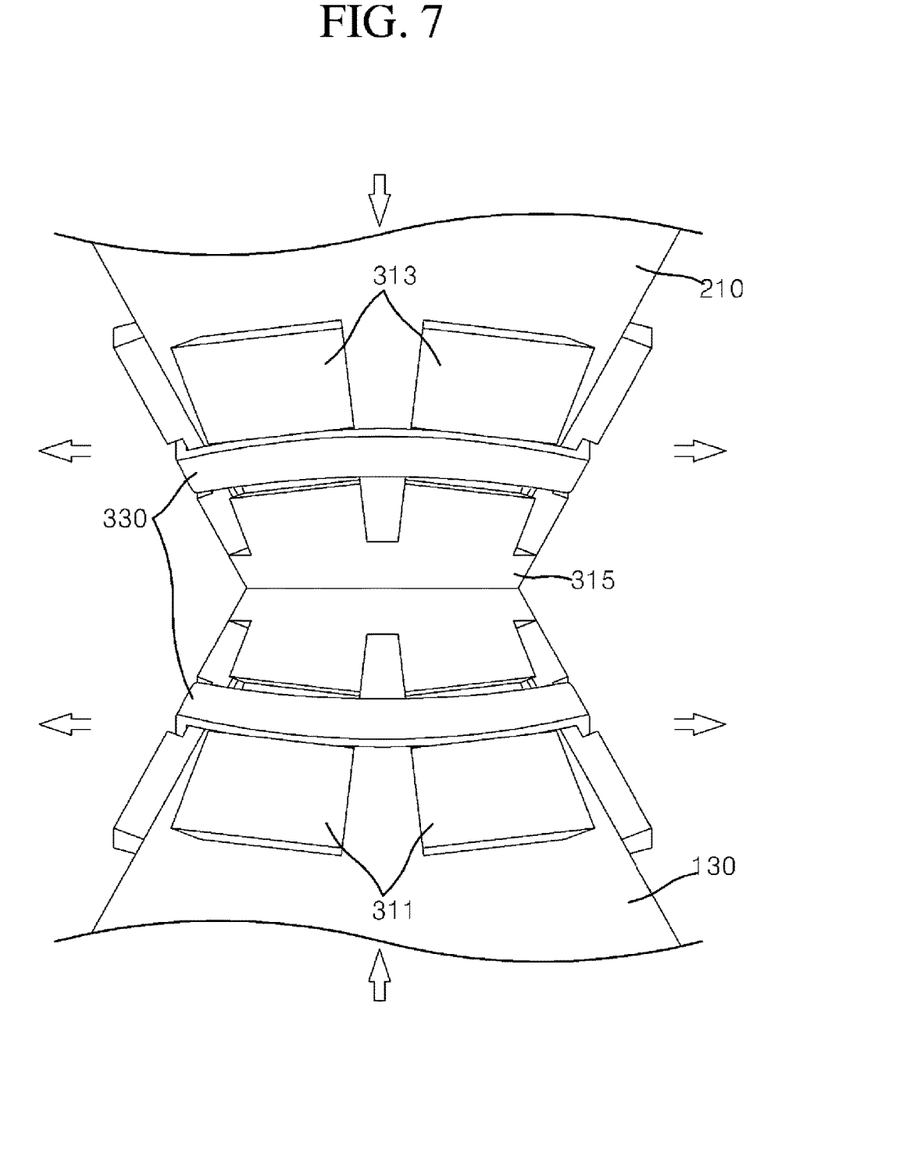
FIG. 7 is a diagram illustrating deformation of the coupler member in the MDPS system in accordance with an embodiment of the present invention.

FIG. 4 is a perspective view illustrating a state in which the rotating shaft and the worm shaft are coupled to the coupler member in the MDPS system in accordance with an embodiment of the present invention. FIG. 5 is a schematic perspective view of the coupler member in the MDPS system in accordance with an embodiment of the present invention. FIG. 6 is a schematic front view of the coupler member in the MDPS system in accordance with an embodiment of the present invention. FIG. 7 is a diagram illustrating deformation of the coupler member in the MDPS system in accordance with an embodiment of the present invention.

Referring to FIGS. 4 to 7, the coupler member 300 may be interposed between the driving member 100 and the worm shaft member 200, and transmit power generated from the driving member 100 to the worm shaft member 200. In an embodiment of the present invention, the coupler member 300 may include a couple sleeve part 311, 313, and 315 and a sleeve pressurizing part 330.

The couple sleeve part 311, 313, and 315 may surround the driving member 100 and the worm shaft member 200, and transmit the power of the driving member 100 toward the worm shaft member 200. In an embodiment of the present invention, the couple sleeve part 311, 313, and 315 may include a driving member sleeve 311, a worm shaft sleeve 313, and a sleeve connection part 315.

The driving member sleeve 311 may surround the rotating shaft 130 of the driving member 100. In an embodiment of the present invention, the driving member sleeve 311 may include a plurality of driving member sleeves formed in a plate shape. The plurality of driving member sleeves may be arranged along the circumference of the rotating shaft 130 of which the cross-sectional shape is a polygonal shape, and rotated with the rotating shaft 130 while coming in surface contact with the rotating shaft 130.

Thus, although the rotating shaft 130 is inclined at a predetermined angle with respect to the worm shaft member 200 by tilting of the worm shaft member 200, the spaces between the respective driving member sleeves 311 adjacent to each other may be deformed to absorb the tilting. Then, while the contact with the rotating shaft 130 is maintained, the occurrence of noise and the damage of the system can be prevented.

The worm shaft sleeve 313 may surround the worm shaft member 200. In an embodiment of the present invention, the worm shaft sleeve 313 may include a plurality of worm shaft sleeves formed in a plate shape. The plurality of driving member sleeves may be arranged along the circumference of the worm shaft 210 of which the cross-sectional shape is a polygonal shape, and rotated with the worm shaft 210 while coming in surface contact with the worm shaft 210.

Thus, although the worm shaft 210 is inclined at a predetermined angle with respect to the rotating shaft 130, the spaces between the respective worm shaft sleeves 313 adjacent to each other may be deformed to buffer the inclination. Thus, while the contact with the worm shaft 210 is maintained, the occurrence of noise and the damage of the system can be prevented.

The sleeve connection part 315 may connect the driving member sleeve 311 to the worm shaft sleeve 313, and have a transverse cross-section formed in a polygonal shape. In an embodiment of the present invention, as both ends of the sleeve connection part 315 are connected to the driving member sleeve 311 and the worm shaft sleeve 313, respectively, the sleeve connection part 315 may transmit a rotational force inputted from the driving member sleeve 311 to the worm shaft sleeve 313 to rotate the worm shaft 210.

In an embodiment of the present invention, the driving member sleeve 311 may be inclined with respect to the central axis C of rotation toward the worm shaft member 200, such that the end of the rotating shaft 130 having a tapered shape is inserted and coupled to the driving member sleeve 311.

In an embodiment of the present invention, the worm shaft sleeve 313 may be inclined with respect to the central axis C of rotation toward the driving member 100, such that the end of the worm shaft 210 having a tapered shape is inserted and coupled to the worm shaft sleeve 313.

Thus, the couple sleeve part 311, 313, and 315 may have a shape of which the central part is narrowed from the driving member 100 toward the left end of the worm shaft member 200 (that is, '> <'). The right ends of the rotating shaft 130 and the worm shaft 210 may be inserted and coupled to the couple sleeve part 311, 313, and 315.

Thus, the couple sleeve part 311, 313, and 315 may apply a restoring force in the direction where the rotating shaft 130 and the worm shaft 210 are separated from each other, such that the worm gear 230 and the worm wheel 10 are engaged with each other at a predetermined pressure or more, thereby preventing rattle noise or the like. Furthermore, the couple sleeve part 311, 313, and 315, the rotating shaft 130, and the worm shaft 210 may be close to each other to reliably transmit a rotating force.

Figure 8:
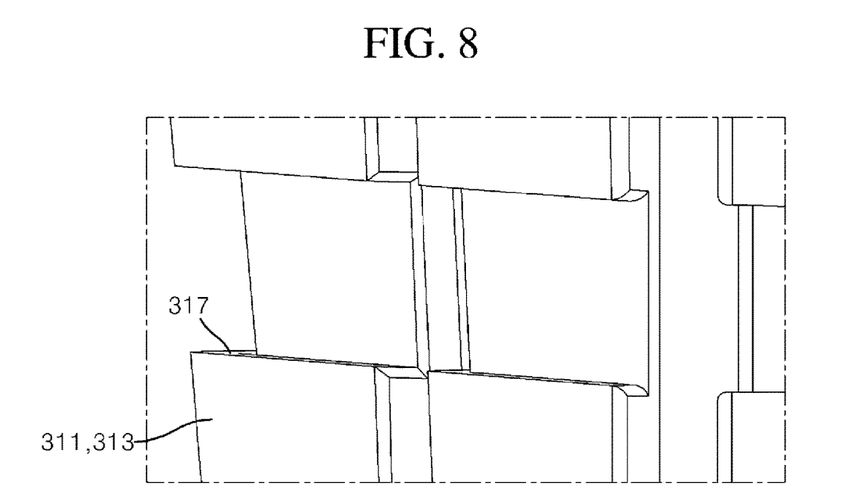
FIG. 8 is a diagram illustrating a pressurizing part seating groove of the MDPS system in accordance with an embodiment of the present invention.
Figure 9:
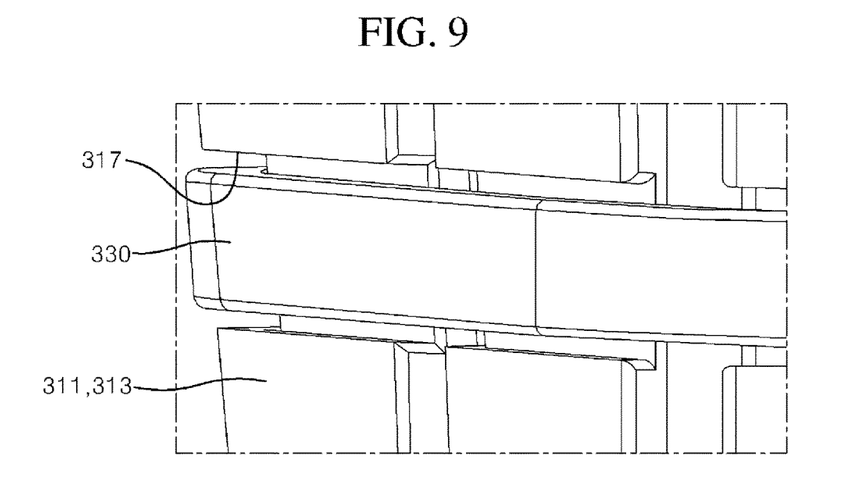
FIG. 9 is a diagram illustrating the state in which a sleeve pressurizing part is seated in the pressurizing part seating groove in the MDPS system in accordance with an embodiment of the present invention.
Figure 10:
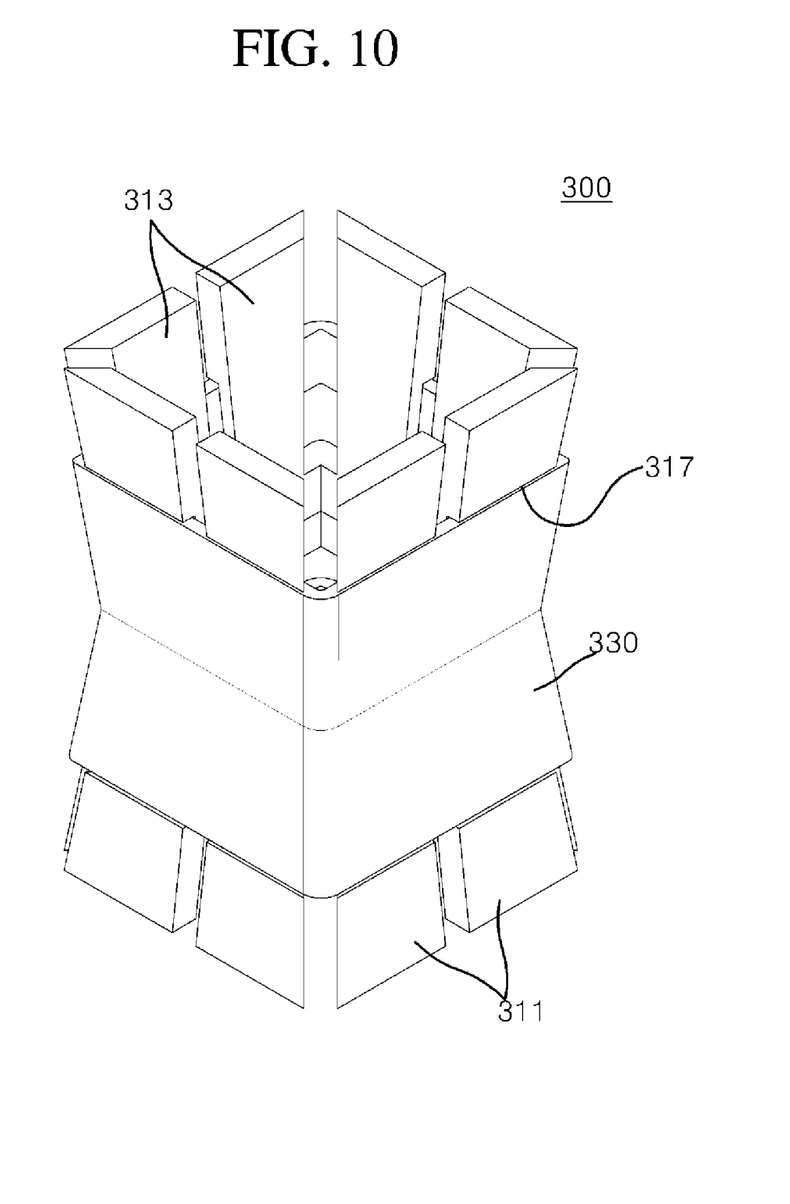
FIG. 10 is a diagram illustrating another example of the sleeve pressurizing part in the MDPS system in accordance with an embodiment of the present invention.

FIG. 8 is a diagram illustrating a pressurizing part seating groove of the MDPS system in accordance with an embodiment of the present invention. FIG. 9 is a diagram illustrating the state in which a sleeve pressurizing part is seated in the pressurizing part seating groove in the MDPS system in accordance with an embodiment of the present invention. FIG. 10 is a diagram illustrating another example of the sleeve pressurizing part in the MDPS system in accordance with an embodiment of the present invention.

Referring to FIGS. 8 to 10, the sleeve pressurizing part 330 may surround the couple sleeve part 311, 313, and 315, and pressurize the couple sleeve part 311, 313, and 315 toward the driving member 100 or the worm shaft member 200. In an embodiment of the present invention, the sleeve pressurizing part 330 may be formed of an elastic material, and have a ring shape. The sleeve pressurizing part 330 may be inserted into the pressurizing part seating groove 317 formed in a concave shape on the outer circumferential surface of the couple sleeve part 311, 313, and 315 in a state where the length thereof is increased. Then, the sleeve pressurizing part 330 may pressurize the couple sleeve part 311, 313, and 315 toward the rotating shaft 130 or the worm shaft 210 using a restoring force, such that the couple sleeve part 311, 313, and 315 is close to the rotating shaft 130 or the worm shaft 210.

In an embodiment of the present invention, the shape and number of the sleeve pressurizing part 330 may be changed according to the specification of the system and the shape of the couple sleeve part 311, 313, and 315. In order to change the extent that the couple sleeve part 311, 313, and 315 is pressurized, the number of sleeve pressurizing parts may be adjusted, or a sleeve pressurizing part 330 having a different elastic force may be applied.

In an embodiment of the present invention, the driving member sleeve 311, the worm shaft sleeve 313, and the sleeve connection part 315 may be integrated with each other, and include an elastic material to enable tilting between the worm shaft 210 and the rotating shaft 130.

Hereafter, the operation and advantages of the MDPS system 1 in accordance with an embodiment of the present invention will be described as follow.

The rotational force generated from the driving unit 110 may rotate the rotating shaft 130. Since the rotating shaft 130 is firmly close to the driving member sleeve 311 by the elastic force of the driving member sleeve 311 and the force of the sleeve pressurizing part 330 to pressurize the driving member sleeve 311, the rotating shaft 130 may be rotated with the driving member sleeve 311.

The rotational force transmitted to the driving member sleeve 311 may be transmitted to the worm shaft sleeve 313 through the sleeve connection part 315, and rotate the worm shaft 210 close to the worm shaft sleeve 313. When the worm shaft 210 is rotated, the worm gear 230 may rotate the worm wheel 10 to assist a steering force.

In an embodiment of the present invention, since the coupler member 300 and the rotating shaft 130 and the worm shaft member 200, which are inserted and coupled to the coupler member 300, have a transverse cross-sectional shape formed in a polygonal shape, the MDPS system 1 can transmit the rotary power of the driving unit 110 to the worm shaft member 200 without a loss of the rotary power.

Furthermore, since the coupler member 300 has a simple shape and includes the single couple sleeve part 311, 313, and 315 and the single sleeve pressurizing part 330, the number of parts and the weight of the coupler member 300 can be reduced, and the assembling property and the durability of the coupler member 300 can be improved.

Furthermore, since the coupler member 300 has a transverse cross-sectional surface which is narrowed toward the longitudinal center thereof and the ends of the rotating shaft 130 and the worm shaft 210 have a tapered shape, the coupler member 300 may have a satisfactory assembly property, and maintain an axial load.

Furthermore, since the number of sleeve pressurizing parts 330 can be adjusted or the sleeve pressurizing part 330 can be replaced to control a force of the couple sleeve part 311, 313, and 315 to pressurize the rotating shaft 130, the rattle performance can be easily adjusted according to the specification of the system, and the repair and maintenance can be easily conducted.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A motor driven power steering (MDPS) system comprising:
   a driving member generating power;
   a worm shaft member having a worm gear and rotated while engaged with a worm wheel; and
   a coupler member interposed between the driving member and the worm shaft member, and transmitting the power generated from the driving member to the worm shaft member,
   wherein the coupler member comprises:
   a couple sleeve part surrounding the driving member and the worm shaft member; and
   a sleeve pressurizing part surrounding the couple sleeve part and pressurizing the couple sleeve part toward the driving member or the worm shaft member.

2. The MDPS system of claim 1, wherein the couple sleeve part comprises:
   a driving member sleeve surrounding a rotating shaft of the driving member;
   a worm shaft sleeve surrounding the worm shaft member; and
   a sleeve connection part connecting the driving member sleeve and the worm shaft sleeve.

3. The MDPS system of claim 2, wherein the sleeve connection part has a transverse cross-sectional surface formed in a polygonal shape.

4. The MDPS system of claim 2, wherein the driving member sleeve is arranged along the circumference of the rotating shaft.

5. The MDPS system of claim 2, wherein the worm shaft sleeve is arranged along the circumference of the worm shaft member.

6. The MDPS system of claim 2, wherein end parts of the rotating shaft and the worm shaft member, inserted into the sleeve connection part, have a transverse cross-sectional surface formed in a polygonal shape.

7. The MDPS system of claim 6, wherein end parts of the rotating shaft and the worm shaft member, coupled to the coupler member, have a shape of which the transverse cross-sectional surface is narrowed along the direction in which the rotating shaft and the worm shaft member are inserted into the coupler member.

8. The MDPS system of claim 7, wherein the rotating shaft and the worm shaft member are inserted and coupled to the coupler member.

9. The MDPS system of claim 2, wherein the sleeve pressurizing part is formed in a ring shape including an elastic material, and seated on the outer circumferential surface of the couple sleeve part so as to pressurize the couple sleeve part toward the rotating shaft or the worm shaft member.

10. The MDPS system of claim 9, wherein the sleeve pressurizing part is seated in a pressurizing part seating groove formed in a concave shape on the outer circumferential surface of the couple sleeve part.

11. The MDPS system of claim 2, wherein the driving member sleeve, the worm shaft sleeve, and the sleeve connection part are formed of an elastic material.

12. The MDPS system of claim 11, wherein the driving member sleeve, the worm shaft sleeve, and the sleeve connection part are integrated with each other.

* * * * *